United States Patent
Furuhashi et al.

(10) Patent No.: US 11,906,449 B2
(45) Date of Patent: Feb. 20, 2024

(54) MASS SPECTROMETER

(71) Applicant: SHIMADZU CORPORATION, Kyoto (JP)

(72) Inventors: Osamu Furuhashi, Kyoto (JP); Junichi Taniguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/645,354

(22) Filed: Dec. 21, 2021

(65) Prior Publication Data

US 2022/0236200 A1 Jul. 28, 2022

(30) Foreign Application Priority Data

Jan. 28, 2021 (JP) ................. 2021-012459
Oct. 5, 2021 (JP) ................. 2021-163930

(51) Int. Cl.
*G01N 23/20058* (2018.01)
*H01J 49/02* (2006.01)

(52) U.S. Cl.
CPC ...... *G01N 23/20058* (2013.01); *H01J 49/022* (2013.01); *H01J 49/025* (2013.01); *G01N 2223/101* (2013.01)

(58) Field of Classification Search
CPC ........... G01N 23/20058; G01N 23/205; G01N 23/20008; G01N 23/20075; G01N 23/20091; G01N 2223/101; G01N 15/0211; G01N 21/4788; H01J 49/022; H01J 49/025; H01J 49/004
USPC ................................. 250/290, 281
See application file for complete search history.

(56) References Cited

U.S. PATENT DOCUMENTS

| | | | |
|---|---|---|---|
| 9,892,903 B1* | 2/2018 | Canterbury | H01J 49/427 |
| 2012/0138788 A1* | 6/2012 | Taniguchi | H01J 49/424 |
| | | | 250/287 |
| 2015/0168318 A1* | 6/2015 | Beckman | H01J 49/0431 |
| | | | 250/311 |

OTHER PUBLICATIONS

Masaki Hada, "Ultrafast Structural Dynamics with Tabletop Femtosecond Electron Diffraction Setups", Journal of the Vacuum Society of Japan, 2016, 24pages, vol. 59, No. 2.
Keiko Kato, "Doctoral Dissertation Development of ion-trap gas electron diffraction apparatus for determining geometrical structure of molecular ions and probing their reaction", School of Science, The University of Tokyo, 2006, 8pages.

(Continued)

*Primary Examiner* — Kiet T Nguyen
(74) *Attorney, Agent, or Firm* — Sughrue Mion, PLLC

(57) ABSTRACT

A mass spectrometer (1) includes: an ionization section (201) configured to generate ions from a sample; a mass separation section (231, 235) configured to separate ions generated by the ionization section according to mass-to-charge ratio; an ion detector (237) configured to detect an ion separated by the mass separation section; an ion capture section (31) configured to capture ions separated by the mass separation section; and an electron beam detection section (32) configured to detect an electron beam diffracted by ions captured within the ion capture section (31). This mass spectrometer is capable of performing, in a single measurement operation, both a mass spectrometric analysis and an electron-beam diffraction measurement for distinguishing between isomers. The electron-beam diffraction measurement can be more efficiently performed than in a conventional device of this type.

13 Claims, 10 Drawing Sheets

(56) References Cited

OTHER PUBLICATIONS

Hideki Tanaka et al., "Trapped ion electron diffraction apparatus for determination of geometrical structure of molecular ions", Japan Society for Molecular Science, Abstract of Lecture for Nineth Annual Meeting of Japan Society for Molecular Science 2015 Tokyo, Aug. 31, 2015, 4pages.

Detlef Schooss et al., "The structure of Ag55+ and Ag55 -: Trapped ions electron diffraction and density functional theory", Nano Letters, 2005, pp. 1972-1977, vol. 5, No. 10.

Mathias Maier-Borst et al., "Electron diffraction of trapped cluster ions", Physical Review A, May 1999, pp. R3162-R3165, vol. 59, No. 5.

\* cited by examiner

|  | Retention Time (min.) | Precursor Ion | Product Ion |
|---|---|---|---|
| Compound A | 3.5-5.5 | 250 | 100 |
| Compound B | 5.0-7.0 | 175 | 90 |
| Compound C | 7.5-9.5 | 300 | 125 |
| Compound D | 7.5-9.5 | 300 | 125 |

|  | Retention Time | Target | Electron Diffraction |
|---|---|---|---|
| Time Zone 1 | 3.5-5.0 | Compound A | Not Performed |
| Time Zone 2 | 5.0-5.5 | Compounds A, B | Not Performed |
| Time Zone 3 | 5.5-7.0 | Compound B | Not Performed |
| Time Zone 4 | 7.5-9.5 | Compounds C, D | Performed |

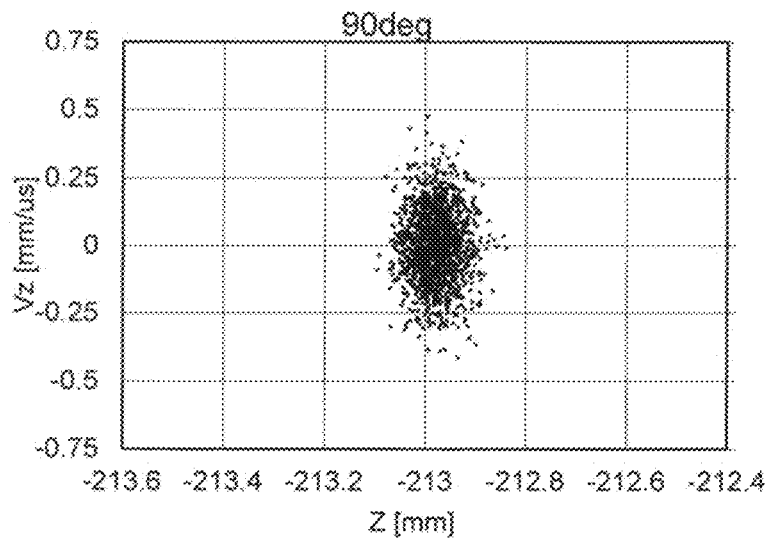
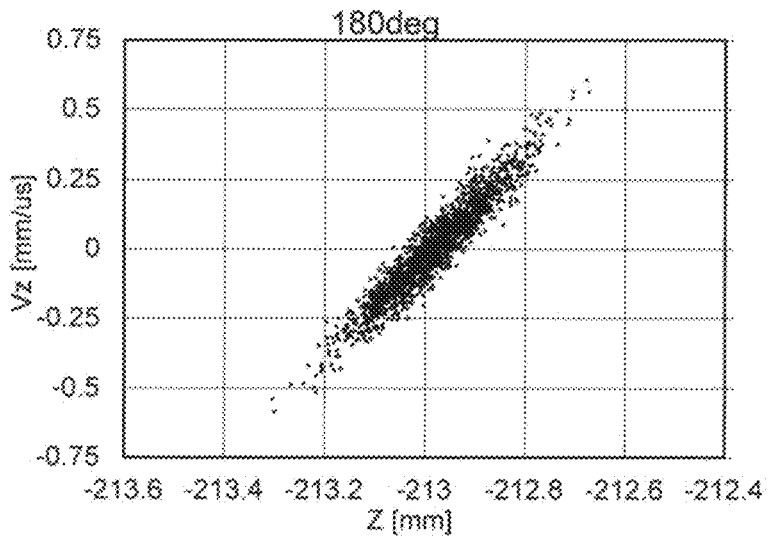

Fig. 19

| Measurement Method | Irradiation Unit (Source of Electromagnetic Waves/Particles) | Detector (Detection Target) | Information to Be Obtained |
|---|---|---|---|
| Electron Diffraction Measurement | Electron beam | Electron | Molecular structure |
| Electron Energy Loss Spectroscopy | Electron beam | Electron | Electronic state |
| EPMA | Electron beam | Electromagnetic waves | Electronic state |
| Ion Scattering Spectroscopic Measurement | Ion beam | Ion | Constituent element |
| Particle Induced Fluorescence Spectroscopy | Ion beam | Electromagnetic waves | Constituent element |
| Atomic Absorption Spectroscopy | Electromagnetic waves | Electromagnetic waves | Constituent element |
| Laser Diffraction Measurement | Electromagnetic waves | Electromagnetic waves | Molecular shape |
| X-ray Diffraction Measurement | Electromagnetic waves | Electromagnetic waves | Molecular structure |
| X-ray Absorption Edge Measurement | Electromagnetic waves | Electromagnetic waves | Bonding state |
| Fourier Transform Infrared Spectroscopy | Electromagnetic waves | Electromagnetic waves | Bonding state |
| Raman Spectroscopic Measurement | Electromagnetic waves | Electromagnetic waves | Bonding state |
| Photoelectron Spectroscopy | Electromagnetic waves | Electron | Bonding state |

MASS SPECTROMETER

TECHNICAL FIELD

The present invention relates to a mass spectrometer.

BACKGROUND ART

Mass spectrometers are widely used for the identification and quantitative determination of a component contained in a sample. In a mass spectrometer, ions produced from a sample component are mass-separated, and an ion intensity is measured at each mass-to-charge ratio. A mass spectrum with the two axes representing the mass-to-charge ratio and ion intensity is created, and the component concerned is identified, for example, based on the degree of matching of the mass spectrum of the component with that of a known substance. The quantity of the component is determined based on the intensity of mass peaks on the mass spectrum.

In the case where the sample component is a comparatively large molecule, it is difficult to identify the sample component directly from the ions produced from that component. Accordingly, an MS/MS analysis is performed which includes the steps of selecting an ion having a specific mass-to-charge ratio as a precursor ion from the ions produced from the sample component, fragmenting the precursor ion into product ions, mass-separating the product ions, and measuring the intensity of each ion having a different mass-to-charge ratio. In the MS/MS analysis, partial structures of the sample component are estimated from the mass-to-charge ratios of the various products ions, and the sample component is identified from the partial structures.

Mass spectrometry is a technique for separating ions according to their mass-to-charge ratios, and therefore, cannot separate ions having the same mass-to-charge ratio. For example, butane and isobutane are structural isomers which differ from each other in the bonding position of the methyl group. Since they are identical in mass, their ions cannot be separated by mass spectrometry. Distinguishing between two structural isomers by fragmenting their respective precursor ions into product ions is also difficult to achieve since it is often the case that the same set of product ions are generated from both isomers.

Accordingly, different measurement methods have conventionally been used in order to acquire information concerning the geometrical structure of molecules (interatomic distance and/or bond angle) which cannot be acquired by mass spectrometry. Examples of those measurement methods include the rotational spectrum measurement, electron diffraction measurement and X-ray diffraction measurement. In the rotational spectrum measurement, a sample gas is irradiated with microwaves to measure absorbance (absorption measurement), or to measure an emission spectrum from the sample gas. This technique is inferior to the diffractive methods, such as the electron diffraction or X-ray diffraction, in terms of sensitivity. The elastic scattering cross section in the X-ray diffraction measurement is as small as $10^{-5}$–$10^{-4}$ times the elastic scattering cross section in the electron diffraction (for example, see Non Patent Literature 1), so that its sensitivity is lower than that of the electron diffraction when the measurement target is a sample gas. Taking these points into account, electron diffraction measurements as described in Non Patent Literatures 2-5 have been proposed for the acquisition of information concerning the geometrical structure of molecules.

Non Patent Literatures 2 and 3 disclose electron diffraction apparatuses. In those apparatuses, a neutral gas molecule is introduced into an ion trap and ionized by irradiation with laser light (photoionization). After a plurality of kinds of ions produced by the ionization have been captured within the ion trap, a mass selection is performed by the ion trap to retain only ions to be analyzed. The ions retained within the ion trap are subsequently irradiated with an electron beam to acquire an electron diffraction image. By analyzing this electron diffraction image, information concerning the geometrical structure of the molecule is obtained.

Non Patent Literature 4 discloses an apparatus in which a device for performing an electron diffraction measurement is combined with a mass spectrometer. This apparatus includes a deflection unit, located in a downstream area from the ionization unit, for deflecting ions in a different flight direction. By switching the deflecting direction by the deflection unit, the ions generated by the ionization unit are introduced into either an ion trap or a time-of-flight mass separator. The ion trap is used to acquire a diffraction image by the irradiation of an electron beam to obtain information concerning the molecular structure of an ion, as in the apparatus described in Non Patent Literatures 2 and 3. The time-of-flight mass separator is used to acquire a mass spectrum to monitor the state of the generation of ions in the ion source.

CITATION LIST

Non Patent Literature

Non Patent Literature 1: Masaki HADA, "Ultrafast Structural Dynamics with Table-top Femtosecond Electron Diffraction Setups", *Journal of the Vacuum Society of Japan*, Vol 59 (2016), No. 2

Non Patent Literature 2: Keiko Kato, Doctoral Dissertation "Development of ion-trap gas electron diffraction apparatus for determining geometrical structure of molecular ions and probing their reaction", 2006, School of Science, The University of Tokyo, [online], [accessed on Dec. 21, 2020], the Internet Non Patent Literature 3: Hideki Tanaka and three other authors, Abstract of Lecture for Nineth Annual Meeting of Japan Society for Molecular Science 2015 Tokyo, "Trapped ion electron diffraction apparatus for determination of geometrical structure of molecular ions", [online], Aug. 31, 2015, Japan Society for Molecular Science, [accessed on Dec. 21, 2020], the Internet Non Patent Literature 4: D. Schooss. M. N. Blom, J. H. Parks, B. V. Issendorff, H. Haberland, and M. M. Kappes, "The structure of $Ag55^+$ and $Ag55^-$: Trapped ions electron diffraction and density functional theory", *Nano Lett.* 5 (2005) 1972.

Non Patent Literature 5: M. Marier-Brost, D. B. Cameron, M. Rokni, and J. H. Parks, "Electron diffraction of trapped cluster ions", *Phys. Rev.* A 59 (1999) R3162.

SUMMARY OF INVENTION

Technical Problem

By combining a configuration for performing an electron diffraction measurement as described in Non Patent Literatures 2-5 with a mass spectrometer, a single apparatus can be obtained which is basically used for mass spectrometry while allowing for the identification of a sample component by acquiring information concerning the geometrical structure of molecules (interatomic distance and/or bond angle)

with a higher level of sensitivity than the rotational spectrum measurement or X-ray diffraction measurement when structural isomers or similar compounds that cannot be easily distinguished by mass spectrometry need to be identified. However, the conventionally proposed electron diffraction apparatuses require the electron-beam irradiation to be continued for an extremely long period of time, e.g., 5-6 hours, to obtain a diffraction image with a sufficient intensity for the analysis. By contrast, the period of time required for mass spectrometry is as short as several minutes. Thus, in the conventional configuration, the electron diffraction measurement performed as an auxiliary measurement requires a far longer period of time than the mass spectrometry performed as the main measurement. Therefore, a technique for more efficiently performing the electron diffraction measurement has been needed.

The description so far has been concerned with an example in which a measurement for obtaining information concerning the geometrical structure of a molecule is performed in addition to the mass spectrometry. Similar problems also occur with various auxiliary measurements which are performed in addition to the mass spectrometry in order to obtain information that cannot be obtained by mass spectrometry.

The problem to be solved by the present invention is to provide a device capable of performing, in a single measurement operation, both a mass spectrometric analysis and an auxiliary measurement for obtaining information that cannot be obtained by mass spectrometry. Another problem is to provide the aforementioned type of device with a technique by which the auxiliary measurement can be more efficiently performed than ever before.

Solution to Problem

The mass spectrometer according to the present invention developed for solving the previously described problem includes:
- an ionization section configured to generate ions from a sample;
- a mass separation section configured to separate ions generated by the ionization section according to mass-to-charge ratio;
- an ion detector configured to detect an ion separated by the mass separation section;
- an ion capture section configured to capture an ion separated by the mass separation section; and
- an auxiliary measurement section configured to measure a physical quantity of the ion captured by the ion capture section, where the physical quantity is different from the mass-to-charge ratio.

Advantageous Effects of Invention

In the mass spectrometer according to the present invention, the ions generated by the ionization section can be mass-separated by the mass separation section, and the mass-separated ions can be individually detected by the ion detector for mass spectrometry. Furthermore, ions to be analyzed can be selected from the ions which have been generated by the ionization section and mass-separated by the mass separation section, and the selected ion can be captured by the ion capture section for a measurement of a physical quantity different from the mass-to-charge ratio ("auxiliary measurement"). For example, the auxiliary measurement may be a measurement in which an ion captured by the ion capture section is irradiated with electromagnetic waves (e.g., a light beam) or a particle beam, and electromagnetic waves (e.g., light) or particles exiting from the ion capture section are detected. As a specific example, an electron diffraction measurement can be performed by accumulating a certain amount of analysis-target ions within the ion capture section, irradiating the ions with an electron beam for a predetermined period of time, and detecting the electron beam diffracted by the ions within the ion capture section. Mass spectrometry cannot distinguish between different kinds of ions if they have the same mass-to-charge ratio, as in the case of isomers. The mass spectrometer according to the present invention can distinguish between isomers or similar compounds by acquiring information concerning their molecular structure by performing an auxiliary measurement, such as the electron diffraction measurement as just described. Additionally, the mass spectrometer according to the present invention allows the flight path of the ions generated by the ionization section to be appropriately changed so that both the mass spectrometric analysis in which the ions are individually detected in a mass-separated form and the auxiliary measurement in which a mass-separated ion is captured for the measurement of a physical quantity different from the mass-to-charge ratio of the ion are performed in a single measurement operation.

If the mass separation were performed using an ion capture section (which is typically a three-dimensional ion trap) with an excessive amount of ions captured within the ion capture section, the electric field within the ion capture section would be distorted due to the charges of the ions themselves (space charges), so that the mass separation would not be correctly achieved. Therefore, a system configured to perform mass separation using an ion capture section in a conventional manner has an upper limit of the amount of ions that can be captured within the ion capture section. Even when the ions generated from the sample have been captured in the maximum amount by the conventional device, the amount of ions will be decreased as a result of the subsequent mass separation. By comparison, the mass spectrometer according to the present invention can operate the mass separation section so as to selectively introduce only the analysis-target ion into the ion capture section, whereby the ion to be analyzed can be captured in the maximum amount and be subjected to the auxiliary measurement. Accordingly, measurement data with higher intensities can be more efficiently obtained within a shorter period of time than ever before.

The ion capture section may be placed between the mass separation section and the ion detector. If a deflection section for deflecting ions in a different flight direction is provided between the mass separation section and the ion detector, the ion capture section may be placed on the flight path of the ions deflected by the deflection section. In the former case, the ion capture section can be disabled so that the ions mass-separated by the mass separation section directly pass through the ion capture section and are detected by the ion detector for mass spectrometry, while the ion capture section can be enabled so that the ions mass-separated by the mass separation section are captured within the ion capture section for the auxiliary measurement. In the latter case, both measurements can be performed in parallel since the flight path of the ions for the mass spectrometry is separated from that of the ions for the auxiliary measurement.

BRIEF DESCRIPTION OF DRAWINGS

FIG. 11 shows a simulation result concerning the spread of ions in the Z-axis direction within the ion trap when the phase of the rectangular voltage applied to the ion trap is 90 degrees.

FIG. 12 shows a simulation result concerning the spread of ions in the Z-axis direction within the ion trap when the phase of the rectangular voltage applied to the ion trap is 180 degrees.

FIG. 19 shows examples of the auxiliary measurement that can be performed in the mass spectrometer according to the present invention.

DESCRIPTION OF EMBODIMENTS

One embodiment of the mass spectrometer according to the present invention is hereinafter described with reference to the drawings.

Figure 1:
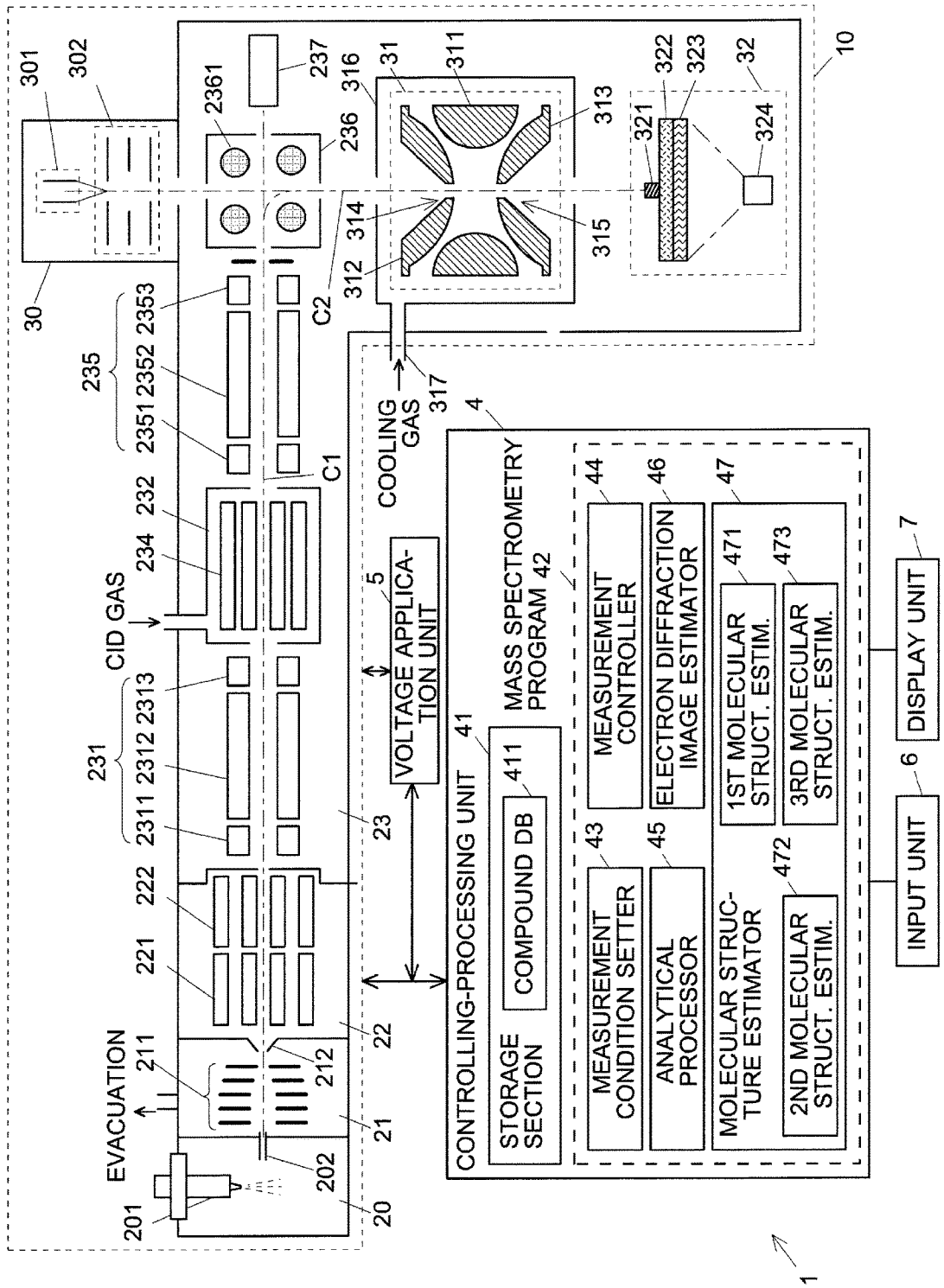
FIG. 1 is a schematic configuration diagram of one embodiment of the mass spectrometer according to the present invention.

FIG. 1 is a schematic configuration diagram of a mass spectrometer 1 according to the present embodiment. The mass spectrometer 1 according to the present embodiment includes a main unit 10 and a controlling-processing unit 4. The main unit 10 includes an ionization chamber 20, first intermediate vacuum chamber 21, second intermediate vacuum chamber 22 and analysis chamber 23. An electron-beam irradiation unit 30 is connected to the analysis chamber 23. A voltage application unit 5 under the control of the controlling-processing unit 4 applies appropriate voltages to related components in the main unit 10 during a measurement.

The ionization chamber 20 is at substantially atmospheric pressure. The first intermediate vacuum chamber 21 is a low-vacuum chamber evacuated by a rotary pump (not shown), while the second intermediate vacuum chamber 22 and the analysis chamber 23 as well as the inner space of the electron-beam irradiation unit 30 are high-vacuum chambers evacuated by turbomolecular pumps (not shown). The first intermediate vacuum chamber 21, second intermediate vacuum chamber 22 and analysis chamber 23 form a multi-stage differential pumping system with their degrees of vacuum increased in a stepwise manner in the mentioned order.

The ionization chamber 20 is provided with an electrospray ionization probe (ESI probe) 201 configured to spray a sample solution while imparting electric charges to the same solution. The ionization chamber 20 communicates with the first intermediate vacuum chamber 21 through a thin heated capillary 202. Although the ESI probe 201 is used as the ionization section in the present embodiment, an appropriate type of ionization section can be used according to the nature of the sample.

The first intermediate vacuum chamber 21 contains an ion lens 211, formed by a plurality of ring-shaped electrodes, for transporting ions to the subsequent stage while converging them. The first and second intermediate vacuum chambers 21 and 22 are separated by a skimmer 212 having a small hole at its apex.

The second intermediate vacuum chamber 22 contains a first ion guide 221 and a second ion guide 222, each of which is formed by a plurality of rod electrodes, for transporting ions to the subsequent stage while converging them. The second intermediate vacuum chamber 22 communicates with the analysis chamber 23 via a small hole formed in the partition wall.

The analysis chamber 23 contains a front quadrupole mass filter (Q1) 231, collision cell 232, rear quadrupole mass filter (Q3), deflection unit 236 and ion detector 237. The front quadruple mass filter 231 is formed by pre-rod electrodes 2311, main rod electrodes 2312 and post-rod electrodes 2313. The collision cell 232 contains quadrupole rod electrodes 234. The collision cell 232 has a gas introduction port for introducing collision-induced dissociation gas (CID gas), such as argon gas or nitrogen gas. The rear quadruple mass filter 235 is formed by pre-rod electrodes 2351, main rod electrodes 2352 and post-rod electrodes 2353. The deflection unit 236 includes four rod electrodes 2361. The deflection unit 236 in the present embodiment is configured to deflect ions in a different flight direction, as will be described later. Any appropriate configuration that can deflect ions in a different flight direction may be adopted for the deflection unit.

Also contained within the analysis chamber 23 are an ion trap 31 and an electron-beam detection unit 32. The ion trap 31 includes a ring electrode 311 as well as an entrance end-cap electrode 312 and an exit end-cap electrode 313 arranged to face each other across the ring electrode 311. The entrance end-cap electrode 312 has an opening 314 for introducing ions and an electron beam. The exit end-cap electrode 313 has an opening 315 as the exit for the ions and the electron beam. The ion trap 31 is placed within a vacuum chamber 316. In the walls of the vacuum chamber 316, two openings corresponding to the aforementioned openings 314 and 315 are formed, as well as a gas introduction port 317 for introducing cooling gas into the ion trap 31. The vacuum chamber 316 is evacuated to a high degree of vacuum by a turbomolecular pump (not shown).

The electron-beam detection unit 32 includes a Faraday cup 321, multichannel plate 322, fluorescent screen 323 and CCD camera 324. The multichannel plate 322 is located on the outside of the exit end-cap electrode 313 within the ion trap 31. The Faraday cup 321 is located in proximity to the front face of the multichannel plate 322 and at a position on the irradiation axis C2 of the electron beam. The fluorescent screen 323 is attached to the back face of the multichannel plate 322. The CCD camera 324 is located on the back side of the fluorescent screen 323 and at a position from which an image of the back side of the screen can be taken.

The electron-beam irradiation unit 30 contains an electron gun 301 and an electron lens 302. This electron-beam irradiation unit 30 is configured so that the amount of incident energy of the electron beam to be delivered into a cloud of ions in an electron diffraction measurement can be changed.

The controlling-processing unit 4 includes a storage section 41 as well as a measurement condition setter 43, measurement controller 44, analytical processor 45, electron diffraction image estimator 46 and molecular structure estimator 47 as its functional blocks. A compound database 411 is stored in the storage section 41. The molecular structure estimator 47 includes a first molecular structure estimator 471, second molecular structure estimator 472 and third molecular structure estimator 473. The controlling-processing unit 4 is actually a common type of personal computer, in which a processor functions as the previously mentioned components by executing a mass spectrometry program 42 previously installed on the computer. An input unit 6 and a display unit 7 are connected to the controlling-processing unit 4.

The compound database 411 holds measurement conditions, analysis results and other pieces of information concerning a large number of known compounds. The measurement conditions include, for example, the time at which the compound flows out of a column of a liquid chromatograph (retention time), as well as the combination of the mass-to-charge ratios of a precursor ion and a product ion characteristic of the compound (MRM transition). The information of the analysis results includes, for example, MS/MS spectrum data and electron diffraction image data of each compound. The electron diffraction image data may be an image experimentally obtained by a measurement of a standard sample, or an image obtained by a theoretical calculation based on the molecular structure of the compound. For the theoretical calculation, the ab initio calculation can be used, for example.

A measurement of a sample using the mass spectrometer 1 according to the present embodiment is hereinafter described. The example hereinafter described is a case where a liquid chromatograph is placed in the previous stage of the mass spectrometer 1 (see FIG. 15), and a sample is introduced into the liquid chromatograph to separate the components in the sample from each other within a column of the liquid chromatograph and perform a measurement of each component in the mass spectrometer 1. It should be noted that the provision of a chromatograph or similar component-separating means is not essential for the present invention. For example, even in the case of a measurement of a sample containing a plurality of compounds, the sample may be directly introduced into the mass spectrometer 1 if the ion originating from the target compound for the measurement can be separated from the ions originating from the other compounds by mass separation only without using the component-separating means.

Initially, the measurement condition setter 43 reads a list of compounds recorded in the compound database 411 and displays it on the display unit 7. The user selects target compounds for the measurement from the list. Then, the measurement condition setter 43 creates method files which describe the measurement conditions recorded in the compound database 411, and creates a batch file for executing the measurement from those method files. The process in which the user selects measurement-target compounds from the compound database 411 in the present embodiment corresponds to the input of the information of the molecular structure candidates in the present invention, and the measurement condition setter 43 in the present embodiment functions as the molecular structure candidate input reception section in the present invention (see [Modes of Invention], which will be described later).

Figures 2, 3, 4:
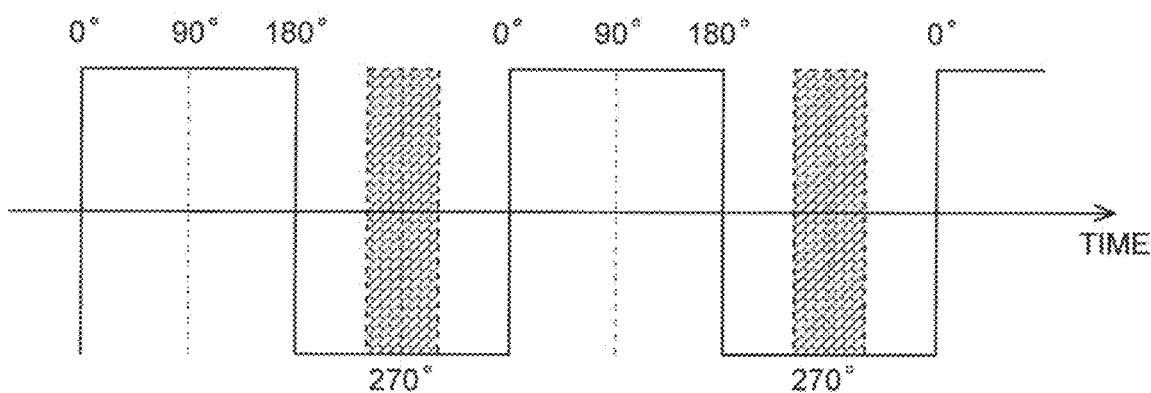
FIG. 2 is a table showing the measurement conditions for target compounds in an example of a measurement using the mass spectrometer according to the present embodiment.
FIG. 3 is a table explaining the contents of a measurement performed in the present embodiment.
FIG. 4 is a diagram explaining a rectangular voltage applied to an ion trap in the present embodiment.

As a specific example, the following description deals with the case where compounds A-D as shown in FIG. 2 are the measurement targets. Among the compounds A-D, compounds C and D are structural isomers. In general, there are structural isomers that can be separated from each other by a column in a liquid chromatograph or gas chromatograph. For the present case, however, it is assumed that compounds C and D are identical in terms of the retention time at which the compounds exit from the column of the liquid chromatograph, as well as in terms of the precursor ion and product ion (that is to say, it impossible to distinguish between compounds C and D by a simple liquid chromatograph-mass spectrometric analysis). Accordingly, in the present case, MRM measurements are performed for all compounds A-D, and furthermore, electron diffraction measurements are performed for compounds C and D. More specifically, a batch file as shown in FIG. 3 is created, according to which the MRM measurement for compound A is performed in time zone 1, followed by time zone 2 in which the MRM measurements for compounds A and B are alternately performed, followed by time zone 3 in which the MRM measurement for compound B is performed, followed by time zone 4 in which the MRM measurement and the electron diffraction measurement for compounds C and D are performed. Whether or not an electron diffraction measurement should be performed may be manually specified by the user, or the measurement condition setter 43 may be configured to automatically set an electron diffraction measurement for the combination of compounds which are identical in terms of the retention time, mass-to-charge ratio of the precursor ion and mass-to-charge ratio of the product ion. It should be noted that two or more MRM transitions may be measured for one compound, although it is hereinafter assumed that a single MRM transition is measured for one compound for ease of description.

After the batch file has been created, the user performs a predetermined input operation to issue a command for the execution of the measurement. Then, the measurement controller 44 conducts the measurement by the following procedure.

Initially, a sample is introduced into the liquid chromatograph. The sample components separated from each other by the column of the chromatograph are sequentially introduced into and ionized by the ESI probe 201.

After the beginning of the measurement, when the first time zone ("time zone 1") specified in the batch file has come, the measurement of the compound specified for that time zone is carried out. In time zone 1, the MRM measurement for compound A is performed. After that, the MRM measurement and the electron diffraction measurement are performed in each time zone based on the descriptions in the batch file.

The MRM measurement performed in time zones 1-4 is hereinafter briefly described. The measurement conditions of the MRM measurements are similar to those of conventional measurements.

The sample component which has exited form the column of the liquid chromatograph is ionized by the ESI probe 201. The resulting ions are introduced through the heated capillary 202 into the first intermediate vacuum chamber 21 and subsequently converged onto the ion beam axis C1 by the ion lens 211. The ions thus converged by the ion lens 211 pass through the skimmer 212 and enter the second intermediate vacuum chamber 22. The ions which have entered the second intermediate vacuum chamber 22 are converged by the first and second ion guides 221 and 222 onto the ion beam axis C1, and enter the analysis chamber 23.

In the analysis chamber 23, the precursor ion of the measurement-target compound is selected by the front quadrupole mass filter 231 and introduced into the collision cell 232. Within the collision cell 232, a predetermined kind of inert gas (typically, argon gas) is contained in a predetermined amount as the collision gas. A potential difference is provided between the post-rod electrodes 2313 of the front quadrupole mass filter 231 and the entrance end of the collision cell 232. Due to this potential difference, the precursor ion of the measurement-target compound gains a specific amount of energy (collision energy) before it enters the collision cell 232. Within the collision cell 232, product ions are produced from the precursor ion due to the collision with the molecules of the inert gas.

Subsequently, only a product ion having a previously determined mass-to-charge ratio (specified in the method file) is selected in the rear quadrupole mass filter 235. The ion selected by the rear quadrupole mass filter 235 directly passes through the deflection unit 236 and is detected by the ion detector 237. Output signals from the ion detector 237 are sequentially sent to and stored in the storage section 41.

Next, the electron diffraction measurement performed in time zone 4 is described.

In the electron diffraction measurement, as in the MRM measurement, ions having a previously determined mass-to-charge ratio are selected as the precursor ion in the front quadrupole mass filter 231, and the precursor ion is fragmented into product ions in the collision cell 232. Subsequently, product ions having a previously determined mass-to-charge ratio are selected as the analysis-target ion in the rear quadrupole mass filter 235. In the electron diffraction measurement, product ions which are identical in mass-to-charge ratio yet include portions with different molecular structures are used as the aforementioned product ion having a previously determined mass-to-charge ratio selected by the rear quadrupole mass filter 235.

When an electron diffraction measurement is performed, the vacuum chamber 316 is previously evacuated to a high degree of vacuum to remove neutral gas molecules remaining within the ion trap 31. A voltage with an opposite polarity to the product ion is applied to one of the four rod electrodes 2351 in the deflection unit 236 (the lower-left rod electrode 2361 in FIG. 1) while voltages with the same polarity as the product ion are applied to the other rod electrodes 2361. The magnitudes of the voltages applied to the four rod electrodes 2361 are appropriately set so that the ion which has passed through the rear quadrupole mass filter 235 is deflected and changes its flight direction by 90 degrees (to the downward direction in FIG. 1).

The product ions deflected in a different flight direction by the deflection unit 236 are captured by the ion trap 31 and collected in the central area of the ion trap 31, being cooled due to the collision with the cooling gas (typically, helium gas) which is temporarily introduced into the ion trap 31 through the gas introduction port 317. After the product ions have been accumulated and cooled within the ion trap 31 for a predetermined period of time, an electron beam is delivered from the electron-beam irradiation unit 30 into the ion trap 31.

In a conventionally proposed electron diffraction measurement, ions produced from a sample are directly accumulated within the ion trap, and the mass separation is subsequently performed within the ion trap to select measurement-target ions. If an excessive amount of ions were accumulated through the process of accumulating the ions produced from the sample, the electric charges of the ions themselves (called the "space charges") would distort the electric field within the ion trap and prevent the mass separation from being correctly performed. Accordingly, there is an upper limit of the amount of ions that can be accumulated within the ion trap in the phase of accumulating the ions produced from the sample. Furthermore, in the conventional measurement, ions produced from a sample are introduced into the ion trap and the mass separation for selecting measurement-target ions is subsequently performed within the same ion trap. Therefore, even when the maximum amount of ions that can be accumulated have been initially accumulated, the amount of analysis-target ions included in those ions will inevitably be smaller than the maximum amount.

By comparison, in the mass spectrometer according to the present embodiment, the product ions to be analyzed are selected by the front quadrupole mass filter 231, collision cell 232 and rear quadrupole mass filter 235 before being introduced into the ion trap 31. Therefore, it is unnecessary to perform mass separation within the ion trap 31, and the product ions to be subjected to the analysis can be exclusively introduced into the ion trap 31 without an upper limit of the amount of ions to be accumulated within the ion trap 31.

In a conventional method of capturing ions within an ion trap, a radio-frequency sinusoidal voltage is applied to the ring electrode while the ground potential is given to the entrance end-cap electrode and the exit end-cap electrode. The mass-to-charge ratio (range) of the ions to be captured is increased or decreased by increasing or decreasing the amplitude of the sinusoidal voltage (voltage-driving) while constantly maintaining the frequency of the voltage. By this conventional method, the larger the mass-to-charge ratio of the ions to be captured is, the larger the amplitude of the sinusoidal voltage must be, which requires a large-sized expensive power source capable of producing high voltages. There are also other problems: The application of the high voltage means that electric discharge is likely to occur. The application of the temporally changing high voltage produces an adverse effect on the flight path of the electrons.

By comparison, in the present embodiment, while the ground potential is given to the entrance end-cap electrode 312 and the exit end-cap electrode 313, a rectangular voltage generated by the voltage application unit 5 by means of a digital circuit is applied to the ring electrode 311 of the ion trap 31. An ion trap which captures ions by applying a rectangular voltage in this manner is called a "digital ion trap" (DIT). In the DIT, the mass-to-charge ratio (range) of the ions to be captured in the ion trap 31 is changed by varying the frequency of the rectangular voltage over a wide range (frequency-driving) while constantly maintaining its amplitude. Digital ion traps do not require a large-sized expensive power source since the amplitude of the rectangular voltage is constantly maintained regardless of the mass-to-charge ratio(s) of the ions to be captured. There is no possibility of an occurrence of electric discharge. Furthermore, since the frequency-driving allows the frequency to be varied over a wide range, the DIT can cover a wider range of mass-to-charge ratios and capture a wider variety of ions than the conventional voltage-driven ion trap. For example, lowering the frequency enables the DIT to capture ions with large mass-to-charge ratios which are difficult to capture with the conventional voltage-driven ion trap, or to capture microscopic charged particles which are much larger than ions. Furthermore, when a rectangular voltage with a low frequency is applied in order to capture a precursor ion having a large mass-to-charge ratio, the frequency of the rectangular voltage can be instantaneously switched to be higher (i.e., the frequency can be jumped) so as to subsequently capture, within the ion trap, fragment ions with smaller mass-to-charge ratios which are produced through the fragmentation (i.e., dissociation) of the captured precursor ion by laser irradiation or other fragmentation techniques. Additionally, the possibility that the rectangular voltage (radio-frequency voltage) produces an adverse effect on the flight path of the electrons can be eliminated by injecting the electron beam at the exact timing when the rectangular voltage is in the predetermined phase, as will be described later.

Figure 5:
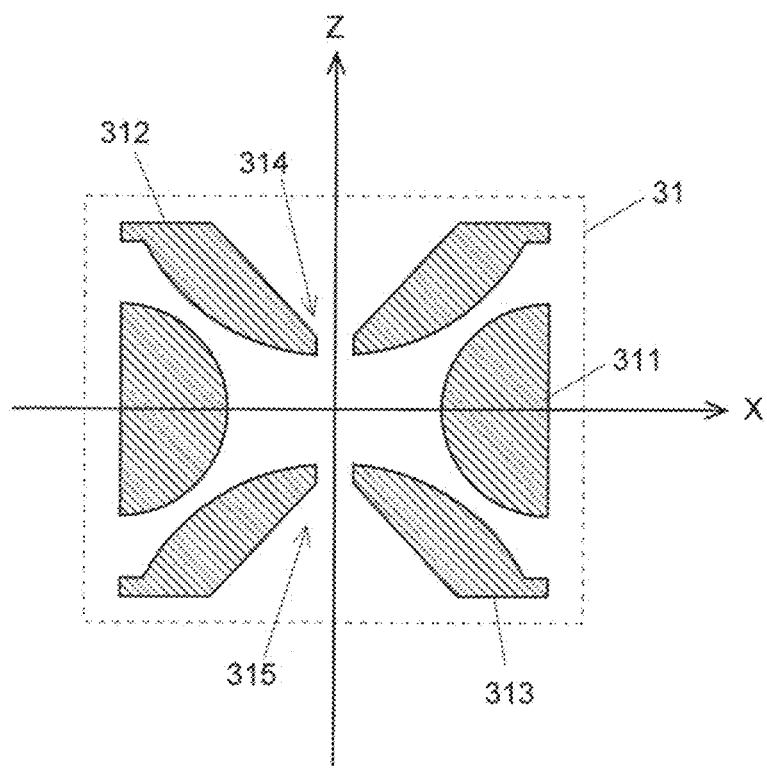
FIG. 5 shows the ion trap used in the mass spectrometer according to the present embodiment.
Figure 6:
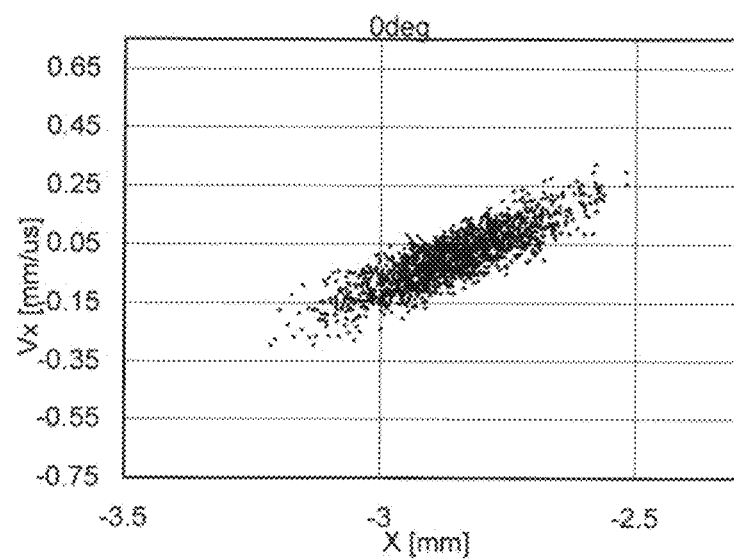
FIG. 6 shows a simulation result concerning the spread of ions in the X-axis direction within the ion trap when the phase of the rectangular voltage applied to the ion trap is 0 degrees.
Figure 7:
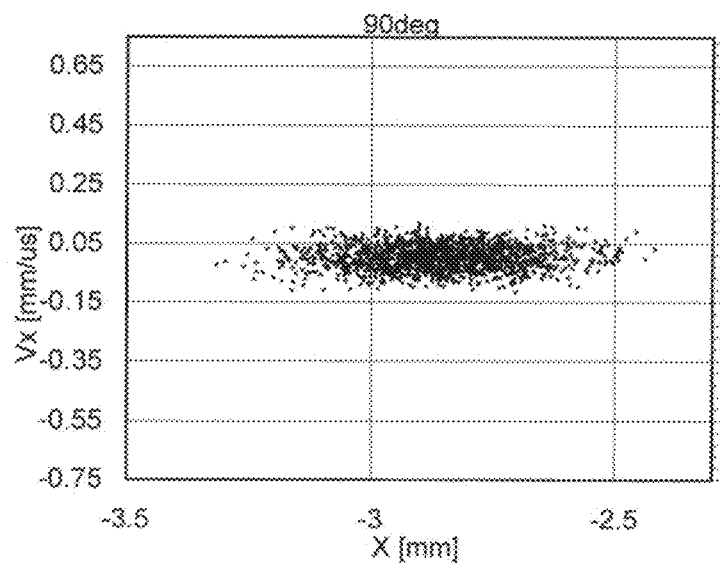
FIG. 7 shows a simulation result concerning the spread of ions in the X-axis direction within the ion trap when the phase of the rectangular voltage applied to the ion trap is 90 degrees.
Figure 8:
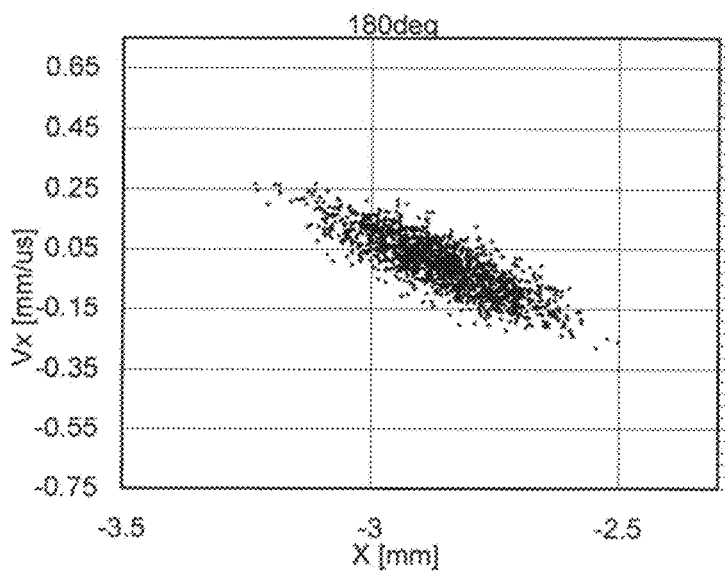
FIG. 8 shows a simulation result concerning the spread of ions in the X-axis direction within the ion trap when the phase of the rectangular voltage applied to the ion trap is 180 degrees.
Figure 9:
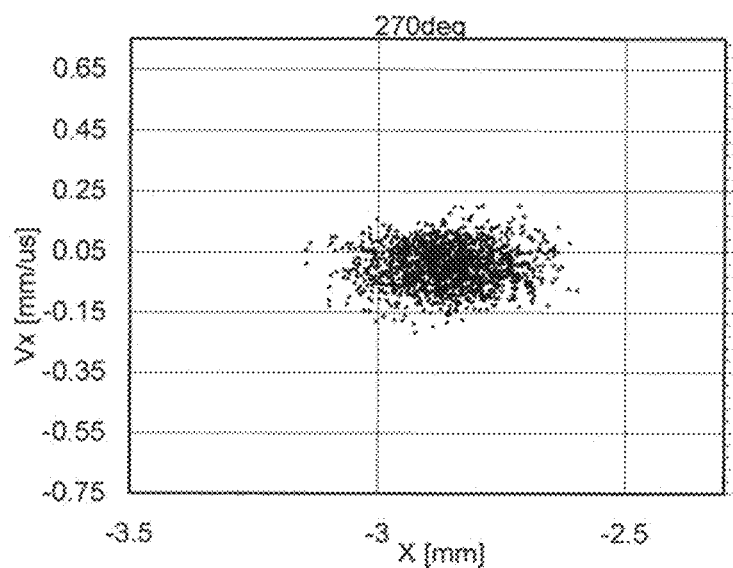
FIG. 9 shows a simulation result concerning the spread of ions in the X-axis direction within the ion trap when the phase of the rectangular voltage applied to the ion trap is 270 degrees.
Figure 10:
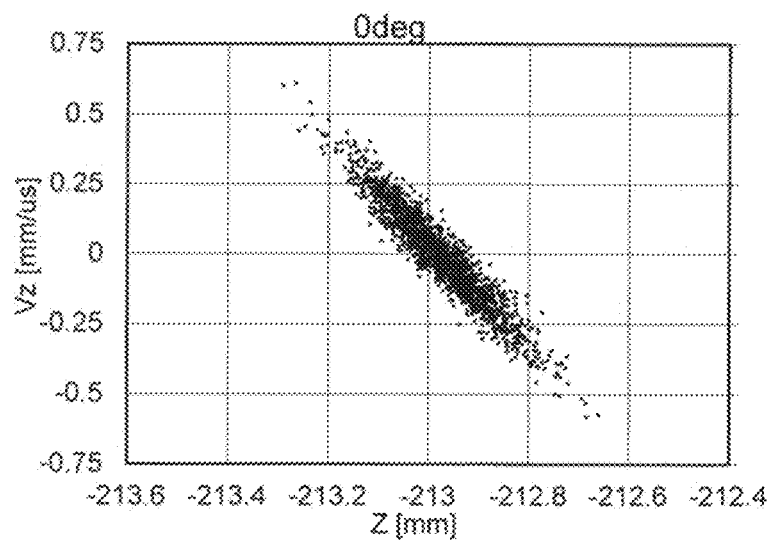
FIG. 10 shows a simulation result concerning the spread of ions in the Z-axis direction within the ion trap when the phase of the rectangular voltage applied to the ion trap is 0 degrees.
Figure 13:
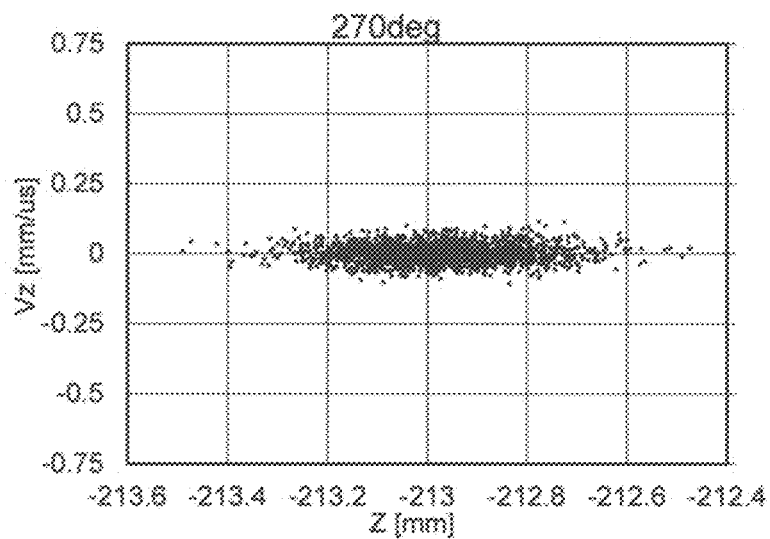
FIG. 13 shows a simulation result concerning the spread of ions in the Z-axis direction within the ion trap when the phase of the rectangular voltage applied to the ion trap is 270 degrees.

In the mass spectrometer 1 according to the present embodiment, this rectangular voltage is applied to the ring electrode 311 for a predetermined period of time to capture product ions within the ion trap 31. During this period, the spatial distribution of the ions within the ion trap 31 changes with the phase of the rectangular voltage applied to the ring electrode 311. The following description assumes that, as shown in FIG. 4, the phase at the point in time where the applied voltage transitions from the negative to the positive side is defined as 0 degrees, and the phase at the point in time where the applied voltage transitions from the positive to the negative side is defined as 180 degrees. Additionally, as shown in FIG. 5, the symmetrical axis of the ion trap 31 (which passes through the opening 314 in the entrance end-cap electrode 312 and the opening 315 of the exit end-cap electrode 313) is defined as the Z axis, and one direction perpendicular to the Z axis is defined as the X axis.

The present inventors have conducted a simulation for investigating the correlation between the phase of the rectangular voltage and the state of motion (spatial distribution and velocity distribution) of the ions. The simulation results are hereinafter described.

FIGS. 6-9 show the results of the simulation in which the positional dispersion of the ions in the X-axis direction (X) and their velocities in the X-axis direction (Vx) within the ion trap 31 were calculated for the rectangular voltage with phases of 0, 90, 180 and 270 degrees, respectively. These results demonstrate that a change in the phase of the rectangular voltage applied to the ring electrode 311 does not cause a significant change in the positional dispersion of the ions in the X-axis direction.

FIGS. 10-13 show the results of the simulation in which the positional dispersion of the ions in the Z-axis direction (Z) and their velocities in the Z-axis direction (Vx) within the ion trap 31 were calculated for the rectangular voltage with phases of 0, 90, 180 and 270 degrees, respectively. Unlike the case of the X-axis direction, these results demonstrate that a change in the phase of the rectangular voltage applied to the ring electrode 311 causes a significant change in the positional dispersion of the ions in the Z-axis direction. What is particularly noteworthy is that the ions are most widely dispersed in the Z-axis direction and most narrowly distributed in the X-axis direction at the phase of 270 degrees. Since the electron beam from the electron-beam irradiation unit 30 is delivered in the Z-axis direction (toward the negative side of the Z axis), delivering the electron beam into the ion trap 31 at this timing yields the highest electron-irradiation efficiency for the ions captured within the ion trap 31. In other words, there is the largest spatial overlap between the cloud of ions and the electron beam. Accordingly, in the present embodiment, the electron beam is delivered from the electron-beam irradiation unit 30 into the ion trap 31 in the vicinity of the timing when the phase of the rectangular voltage applied to the ring electrode 311 becomes 270 degrees (the timing indicated by the shaded areas in FIG. 4).

Furthermore, in the conventional ion trap, the electron beam is continuously delivered to irradiate the ions captured within the ion trap. The direction and/or magnitude of the deflection of the electron beam temporally changes due to the temporal change of the radio-frequency sinusoidal voltage applied to the ring electrode. Consequently, the amount of background which does not contribute to the diffraction increases, causing the electron diffraction image to be less clear.

By comparison, in the mass spectrometer 1 according to the present embodiment, a pulsed beam of electrons is delivered at the timing in the vicinity of the timing at which the rectangular voltage has a phase of 270 degrees. This means that the electric field created within the ion trap 31 is identical at any timing of the delivery of the electron beam. Therefore, the influence of the electric field on the path of the electron beam can be previously calculated and compensated for by appropriately determining the measurement conditions, such as the direction of the delivery of the electron beam.

The electrons which have passed through the ion trap 31 without being diffracted by the product ions enter the Faraday cup 321. A current corresponding to the amount of incident electrons is generated in the Faraday cup 321. Based on the magnitude of this current, the amount of electrons delivered from the electron-beam irradiation unit 30 is estimated.

The electron beam diffracted by the product ions captured within the ion trap 31 hits the micro channel plate 322. The micro channel plate 322 has a two-dimensional array of electron multiplier tubes. An electron which has entered an electron multiplier tube is thereby multiplied, and the resulting electrons exit from the other end of the tube. The electrons exiting from the electron multiplier tube hit the fluorescent screen 323. A fluorescent material is previously applied to the surface of the fluorescent screen 323. The electrons which have hit the fluorescent screen 323 induce a fluorescent emission from the fluorescent material at the incidence position. The CCD camera 324 located at the back of the fluorescent screen 323 takes images of the fluorescent emission from the fluorescent screen 323 at predetermined periods of time and sequentially sends the image data to the controlling-processing unit 4. The image data received by the controlling-processing unit 4 are stored in the storage section 41.

After the measurements for all time zones have been completed, the analytical processor 45 reads the obtained MRM measurement data for each compound and determines whether or not the compound concerned is indeed present based on the ion intensities in the MRM measurement. It may also determine the quantity of the compound as needed. The quantitative determination of a compound can be achieved by previously storing the information of the calibration curve for the target compound and comparing the ion intensities in the MRM measurement with the calibration curve.

The analytical processor 45 reads the data of the electron diffraction image acquired in time zone 4. It also refers to the compound database 411 and reads the data of the electron diffraction images of compounds C and D which are the measurement targets in time zone 4. If the data of the electron diffraction image of any of the compounds C and D is not recorded in the compound database 411, the electron diffraction image estimator 46 theoretically estimates the electron diffraction image based on the molecular structure information of the compound concerned (e.g., by estimating the molecular structure by the ab initio calculation and theoretically determining the electron diffraction image based on the contribution of each atom) and creates the data of the electron diffraction image of that compound.

Subsequently, the analytical processor 45 compares the measurement data of the electron diffraction image acquired by the measurement with the data of the electron diffraction image of compounds C and D and determines the presence or absence of compounds C and D (i.e., only compound C, only compound D, or both compounds C and D are contained) based on the degree of matching of the two sets of data.

Figure 14:
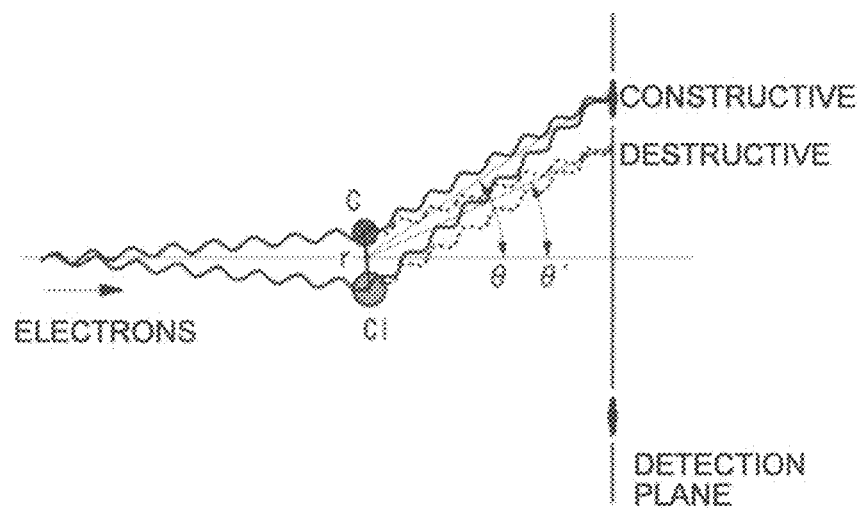
FIG. 14 is a diagram illustrating an electron diffraction measurement.

As one example, an electron diffraction image of carbon tetrachloride ($CCl_4$) is hereinafter described with reference to FIG. 14. Carbon tetrachloride has four carbon atoms (C) and four chlorine atoms (Cl) bonded at interatomic distance r. When this molecule is irradiated with an electron beam, the electrons are scattered in various directions, where the wave (de Broglie wave) of the electrons scattered by C and that of the electrons scattered by Cl constructively interfere with each other in one specific direction at angle θ, while the two waves destructively interfere with each other at another specific angle θ'. Since molecules are randomly oriented, interference fringes in the form of concentric circles are formed on the detection plane. The radii of those concentric circles are related to the interatomic distance r. The distance r can be determined by comparing the observed interference fringes and theoretical fringes w % bile varying distance r as the parameter. In the case of carbon tetrachloride ($CCl_4$), two peaks corresponding to the C—Cl equilibrium distance and the Cl—Cl equilibrium distance will be detected on the radial distribution function.

However, a compound to be measured by liquid chromatograph mass spectrometry or similar techniques normally consists of a larger number of atoms than carbon tetrachloride. In an electron diffraction image of such a type of compound, the peaks corresponding to the interatomic distances overlap each other. Therefore, it is difficult to determine the interatomic distance for each kind of bond in the molecule only from the electron diffraction image.

By comparison, according to the present embodiment, the mass-to-charge ratio of the ion concerned can be known beforehand by the preceding mass spectrometry. Based on this mass-to-charge ratio, the kind of functional group included in the molecular structure of the compound concerned can be predicted, and whether or not that functional group is included can be estimated by determining the presence or absence of an interference fringe specific to that functional group. As for structural isomers, which of the structural isomers the measured compound actually is can be inferred from the interference fringes which exhibit a difference that depends on the positional relationship between the functional group concerned and the position at which the structural isomers differ from each other in molecular structure.

In recent years, the accuracy of the molecular structure (position of each atom in the molecule) determined by the ab initio calculation has improved, so that it is possible to highly accurately estimate, from the molecular structure, the interference fringes which will appear in the electron diffraction image. An electron diffraction image obtained by a simulation based on such a theoretical calculation can be compared with an electron diffraction image obtained by an actual measurement to distinguish between structural isomers or determine a mixture ratio of those isomers.

The mass spectrometer 1 according to the present embodiment can perform various measurements other than the previously described example. Although the MRM measurement is combined with the electron diffraction measurement in the previously described example, a product-ion scan measurement can also be combined with the electron diffraction measurement. For example, it is possible to initially perform a product-ion scan measurement for a measurement-target compound to obtain a product-ion spectrum and subsequently perform an electron diffraction measurement to analyze the structure of an ion corresponding to a peak which has appeared in the spectrum.

In the previously described example, the targets of the measurements (mass spectrometry and electron diffraction measurement) were product ions generated by dissociating a precursor ion having a predetermined mass-to-charge ratio produced from a sample. The dissociation of an ion in the collision cell 232 may be omitted: ions generated from a sample and mass-separated by the front quadrupole mass filter 231 or rear quadrupole mass filter 233 may be subjected to the measurements (mass spectrometry and electron diffraction measurement).

Figure 15:
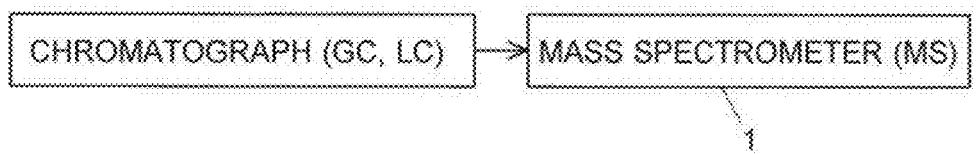
FIG. 15 shows a chromatograph mass spectrometer system employing the mass spectrometer according to the present embodiment.

In the previously described example, the electron diffraction measurement is performed for compounds C and D which cannot be separated by the column of the liquid chromatograph (since their retention times are identical). The electron diffraction measurement is also useful for isomers that can be separated by a column. Liquid chromatographic columns merely separate compounds and do not provide information concerning the molecular structure of each compound. By additionally obtaining information concerning the molecular structure of each compound by the electron diffraction measurement as in the previously described example, each compound separated by the liquid chromatograph can be more accurately analyzed. It should be noted that the chromatograph to be combined with the mass spectrometer 1 according to the present embodiment is not limited to the liquid chromatograph (LC) but may be a gas chromatograph (GC; FIG. 15).

A system in which an ion mobility spectrometer (IMS) is combined with the mass spectrometer 1 according to the present embodiment (FIG. 16), or a system in which a chromatograph apparatus (liquid or gas chromatograph), ion mobility spectrometer and mass spectrometer 1 according to the present embodiment are connected in series from the upstream side (FIG. 17), can also be used for measurements.

Figure 16:
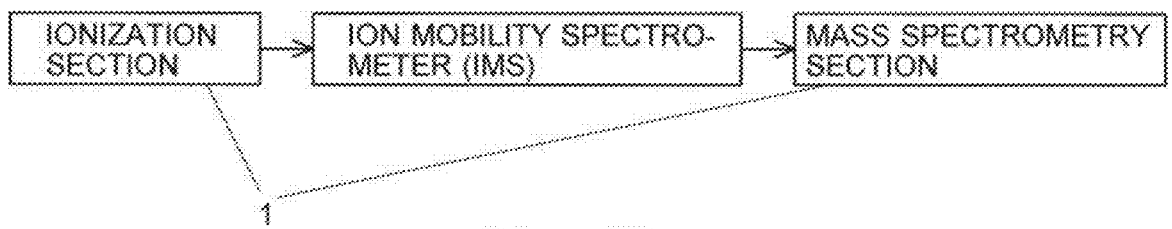
FIG. 16 shows an ion mobility spectrometry-mass spectrometry system employing the mass spectrometer according to the present embodiment.
Figure 17:
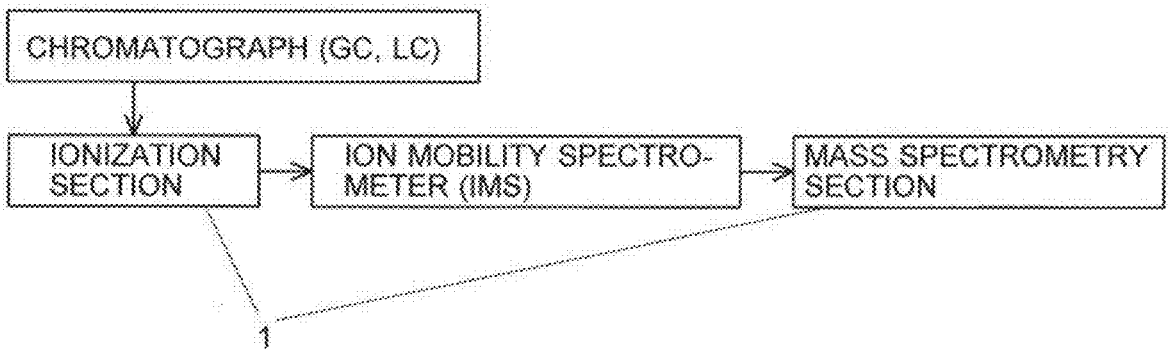
FIG. 17 shows a chromatograph-ion mobility spectrometry-mass spectrometry system employing the mass spectrometer according to the present embodiment.

An ion mobility spectrometer separates ions according to their collision cross sections. It is said that this device can distinguish between isomers. However, a measured value of the collision cross section of an ion often disagrees with a theoretical value. Furthermore, the measured value of the collision cross section of an ion varies depending on the configuration of the device (e.g., depending on the manufacturer) or the kind of gas with which the ion is made to collide. Therefore, in some cases, the molecular structure of an ion cannot be determined by comparing a measured value of the collision cross section of the ion with the values stored in a database. That is to say, as in the case of a chromatograph apparatus, even when the compounds can be separated, information concerning the molecular structure of each compound cannot be obtained. A system including an ion mobility spectrometer combined with the mass spectrometer 1 according to the present embodiment as shown in FIG. 16 or 17 can obtain not only the collision cross section of an ion but also its molecular structure information by an electron diffraction measurement, whereby the compounds in a sample can be more accurately analyzed. When combining an ion mobility spectrometer with the mass spectrometer 1, the ionization section of the mass spectrometer 1 should be separated from the other components (in the figures, those components are collectively denoted as a "mass spectrometry section" including the electron irradiation unit), and an ion mobility spectrometry section should be arranged between them.

As described earlier, concentric fringes resulting from the interference of electron waves (de Broglie waves) appear in an electron diffraction image. By varying the wavelength of those waves, different electron diffraction images can be obtained from the same molecule. Varying the wavelength of the electron beam used for the electron diffraction measurement changes the pattern of the observed interference fringes due to a change in the interatomic distance at which the electron beams having that wavelength constructively interfere with each other. For the present technique in which the degree of matching of the overall pattern of the interference fringes is determined, the energy of the incident electrons is an essential parameter. Accordingly, in the mass spectrometer 1 according to the present embodiment, when, for example, the structural isomer corresponding to the component contained in the sample has not been identified with a sufficient degree of certainty by the measurements described in the previously described example, an electron diffraction measurement using an electron beam with a different energy can be performed. When setting the measurement conditions through the measurement condition setter 43, the user sets a condition which specifies that an electron beam with different amounts of energy should be used for the electron diffraction measurement. The measurement controller 44 conducts the measurement multiple times, using the electron beam with different wavelengths (i.e., different amounts of energy), to obtain a plurality of electron diffraction images. After the completion of the measurements, the second molecular structure estimator 472 estimates the molecular structure by analyzing the difference in the interference fringes observed on those electron diffraction images.

The electron beam is scattered by both the atomic nucleus and the electrons. Both the size of the atomic nucleus and the number of electrons increase with the atomic number. In other words, the larger the atomic number is, the higher the scattering intensity becomes. Accordingly, for the mass spectrometer 1 according to the present embodiment, a sample in which an atom having a large atomic number (or a functional group including an atom having a large atomic number) is incorporated beforehand by addition or substitution at or near the position at which structural isomers have different molecular structures may be prepared and used in the electron diffraction measurement. In this case, after the completion of the measurements, the third molecular structure estimator 473 extracts interference fringes corresponding to the added atom or functional group from the electron diffraction image and estimates the molecular structure from those fringes.

The previous embodiment is a mere example and can be appropriately changed or modified according to the gist of the present invention.

Although the ESI probe 201 is used as the ionization section in the previous embodiment, an atmospheric pressure chemical ionizer or similar device may also be used as the ionization section. In the case where the measurement target is a gas sample, an electron ionizer or chemical ionizer may also be used.

In the previous embodiment, a triple quadrupole mass spectrometry section is used as the mass spectrometry section. A different type of mass spectrometry section may also be used, such as a quadrupole time-of-flight type. In the case of using an ionization section in which fragment ions occur in the ionization process, as in an electron ionizer, a mass spectrometry section having a single mass separator (e.g., a single quadrupole mass filter) may be used.

Figure 18:
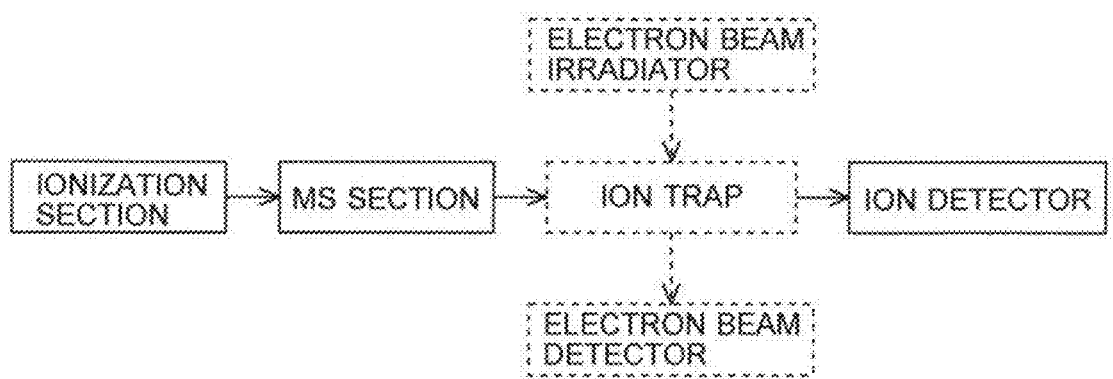
FIG. 18 is an example of the arrangement of the components of the mass spectrometer according to a modified example.

Although the configuration according to the previous embodiment includes the deflection unit 236, a configuration without the deflection unit 236 is also possible. One example of this type of configuration is shown by a block diagram in FIG. 18. In this configuration, when a mass spectrometric analysis is performed (solid lines), no voltage is applied to the ion trap so that the ions which have been mass-separated by the mass spectrometry section w-ill directly pass through the ion trap and be detected by the ion detector. When an electron diffraction measurement is performed (dashed lines), voltages are applied to the ion trap to accumulate ions, and an electron beam is delivered from the electron-beam irradiation section to acquire its diffraction image in the electron-beam detection section.

The mass spectrometer 1 according to the previous embodiment is equipped with the system for electron diffraction in order to acquire information concerning the molecular structure. Based on a similar idea, a mass spectrometer equipped with a system for a rotational spectrum measurement or X-ray diffraction measurement can also be constructed.

Nuclear magnetic resonance (NMR) may also be used for the estimation of a molecular structure. NMR has a significantly low level of sensitivity which is roughly two or more orders of magnitude lower than that of the mass spectrometry. For a measurement of the same sample, NMR requires a separately prepared sample which contains the measurement-target component in a more condensed form than a sample for mass spectrometry. Some samples are difficult to reproduce or prepare in such a form. Product ions employed in the mass spectrometer, as described earlier, are not available in the NMR. NMR measurements must be performed apart from the mass spectrometry. By comparison, the mass spectrometer according to the previous embodiment can perform both the mass spectrometry and electron diffraction measurement in a single measurement operation and with a high level of sensitivity.

In the previous embodiment and modified examples, the electron diffraction measurement is performed along with the mass spectrometry. There are various kinds of auxiliary measurements that can be performed other than the electron diffraction measurement. According to the present invention, a large amount of ions having a specific mass-to-charge ratio (or a specific range of mass-to-charge ratios) can be selectively captured as the measurement-target ions within an ion trap after the mass separation, to measure various physical quantities (and obtain physical properties information) related to the measurement-target ions.

FIG. 19 shows examples of the auxiliary measurement that can be performed in the mass spectrometer according to the present invention. These examples (including the electron diffraction measurement in the previous embodiment) can be categorized as a measurement method in which electromagnetic waves (e.g., a light beam) or a particle beam is delivered into an ion trap, and electromagnetic waves (e.g., light) or particles which ultimately exit from the ion trap after an interaction with ions captured within the ion trap are detected. As for the "interaction", in the case where electromagnetic waves are delivered, the absorption or scattering of the electromagnetic waves by the captured ions can be named as an example. An ion which has absorbed electromagnetic waves and transitioned to an excited state returns to the ground state by radiating electromagnetic waves having a wavelength different from the incident electromagnetic waves, or by emitting a particle beam. In some cases, the electromagnetic waves may be elastically or non-elastically scattered (including diffraction) without being absorbed. In the case where a particle beam is delivered, scattering can be named as an example of the interaction with the captured ions. An ion which has received energy from the incident particles and transitioned to an excited state returns to the ground state by radiating electromagnetic waves or emitting a particle beam. In some cases, the incident particles may be elastically or non-elastically scattered (including diffraction). Other examples of the auxiliary measurement include a measurement method in which electromagnetic waves (e.g., a light beam) or a particle beam is delivered into an ion trap, and electromagnetic waves (e.g., a light beam) or particles which ultimately exit from the ion trap without interacting with the captured ions are detected. In an absorption measurement, electromagnetic waves which have passed through the ion trap without interacting with the captured ions are detected. A measurement in which measurement results obtained with different ion species are compared to analyze their differences can also be included in the auxiliary measurement.

Figure 20:
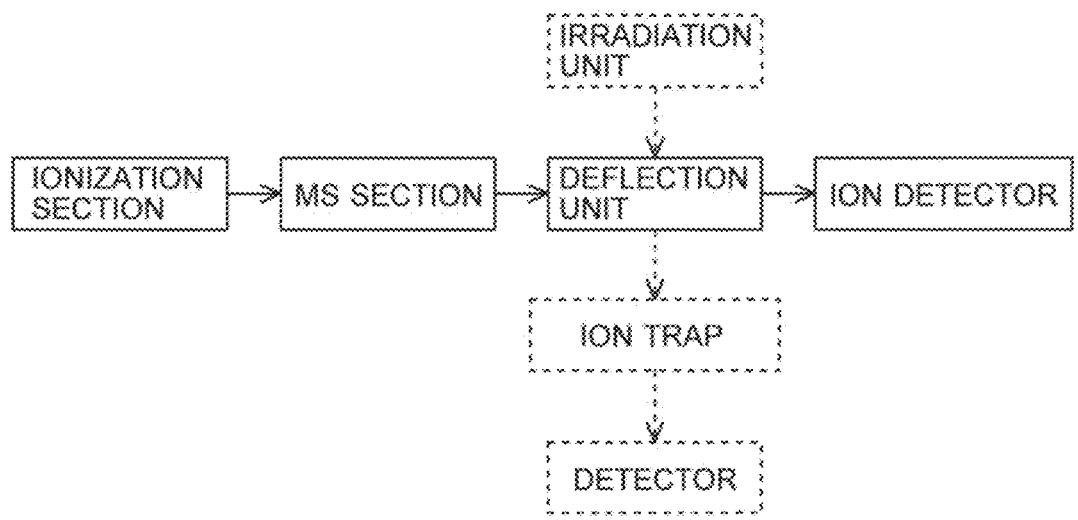
FIG. 20 shows a schematic configuration example of the mass spectrometer configured to perform various auxiliary measurements.
Figure 21:
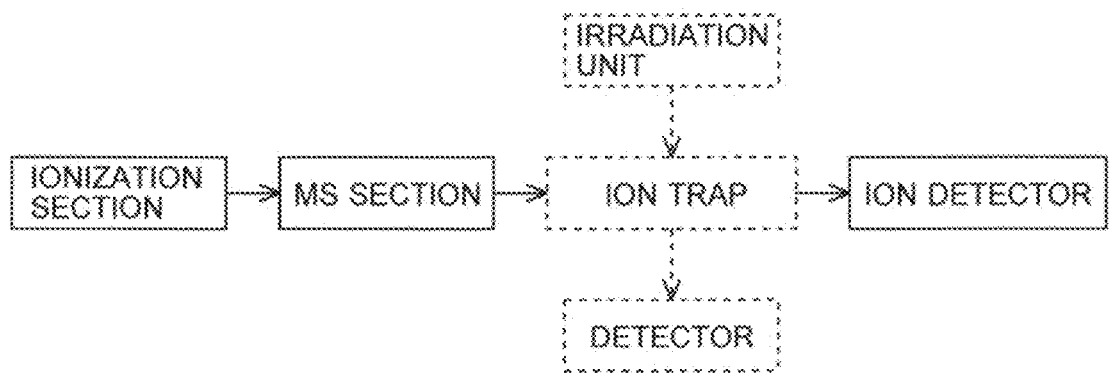
FIG. 21 shows another schematic configuration example of the mass spectrometer configured to perform various auxiliary measurements.

FIGS. 20 and 21 show configuration examples of the device that can be commonly used for the previously mentioned methods. The configuration in FIG. 20 includes a deflection unit, as in the previous embodiment, while the configuration in FIG. 21 includes no deflection unit, as in the previous modified example. In FIGS. 20 and 21, the solid lines indicate components for performing the mass spectrometry, while the dashed lines indicate components for performing the auxiliary measurement.

For example, an electron diffraction measurement can be performed by irradiating a captured ion with an electron beam and measuring the electron beam diffracted by the ion, to obtain information concerning the molecular structure of the ion. Electron energy loss spectroscopy can be performed by irradiating a captured ion with an electron beam to excite the ion and measuring the electrons scattered by the ion, to obtain information concerning the electronic state of the ion. An electronic structure analysis or elemental analysis of an ion can be performed by using the device as an electron microprobe analyzer (EPMA) which irradiates a captured ion with an electron beam to excite the ion, and measures light emitted from the ion. Ion scattering spectroscopy can be performed by irradiating a captured ion with a beam of ion different from the captured ion to excite the captured ion, and detecting the ion scattered by the captured ion, to perform an elemental analysis. Particle induced fluorescence spectroscopy can be performed by irradiating a captured ion with an ion beam to excite the captured ion, and detecting light emitted from the ion, to perform an elemental analysis. Atomic absorption spectroscopy can be performed by irradiating a captured ion with a light beam to excite the ion, and detecting light emitted from the ion, to perform an elemental analysis. A laser diffraction measurement or X-ray diffraction measurement can be performed by irradiating a captured ion with a light beam and detecting the light diffracted by the ion, to obtain information concerning the shape and/or molecular structure of the ion. An X-ray absorption edge measurement or Fourier transform infrared spectroscopy which includes irradiating a captured ion with light and detecting the light transmitted through the ion to measure the amount of absorption of light by the ion, can be performed to obtain information concerning the intramolecular bond of the ion. A Raman spectroscopic measurement can be performed by irradiating a captured ion with light and detecting the light scattered by the ion, to obtain information concerning the intramolecular bond of the ion. A photoelectron spectroscopic measurement which includes irradiating a captured ion with light and measuring electrons emitted from the ion can be performed to obtain information concerning the electronic state or bonding state of the ion.

[Modes of Invention]

A person skilled in the art can understand that the previously described illustrative embodiments are specific examples of the following modes of the present invention.

(Clause 1)

The mass spectrometer according to one mode of the present invention includes:
- an ionization section configured to generate ions from a sample;
- a mass separation section configured to separate ions generated by the ionization section according to mass-to-charge ratio:
- an ion detector configured to detect an ion separated by the mass separation section;
- an ion capture section configured to capture an ion separated by the mass separation section; and
- an auxiliary measurement section configured to measure a physical quantity of the ion captured by the ion capture section, where the physical quantity is different from mass-to-charge ratio.

In the mass spectrometer described in Clause 1, the ions generated by the ionization section can be mass-separated by the mass separation section, and the mass-separated ions can be individually detected by the ion detector for mass spectrometry. Furthermore, an ion to be analyzed can be selected from the ions which have been generated by the ionization section and mass-separated by the mass separation section, and the selected ion can be captured by the ion capture section for a measurement of a physical quantity different from the mass-to-charge ratio ("auxiliary measurement"). For example, the auxiliary measurement may be a measurement in which an ion captured by the ion capture section is irradiated with electromagnetic waves (e.g., a light beam) or a particle beam, and electromagnetic waves (e.g., light) or particles exiting from the ion capture section are detected. As a specific example, an electron diffraction measurement can be performed by accumulating a certain amount of analysis-target ions within the ion capture section, irradiating the ions with an electron beam for a predetermined period of time, and detecting the electron beam diffracted by the ions within the ion capture section. Mass spectrometry cannot distinguish between different kinds of ions if they have the same mass-to-charge ratio, as in the case of isomers. The mass spectrometer described in Clause 1 can distinguish between isomers or similar compounds by acquiring information concerning their molecular structure by performing an auxiliary measurement, such as the electron diffraction measurement as just described. Additionally, the mass spectrometer described in Clause 1 allows the flight path of the ions generated by the ionization section to be appropriately changed so that both the mass spectrometric analysis in which the ions are individually detected in a mass-separated form and the auxiliary measurement in which a mass-separated ion is captured for the measurement of a physical quantity different from the mass-to-charge ratio of the ion are performed in a single measurement operation.

If the mass separation were performed using an ion capture section (which is typically a three-dimensional ion trap) with an excessive amount of ions captured within the ion capture section, the electric field within the ion capture section would be distorted due to the charges of the ions themselves (space charges), so that the mass separation would not be correctly achieved. Additionally, in the conventionally proposed system which introduces ions generated from a sample into the ion capture section and subsequently selects an analysis-target ion by mass separation within the same ion capture section, there is an upper limit of the amount of ions that can be captured within the ion capture section. Even when the ions generated from the sample are initially captured in the maximum amount, the amount of analysis-target ion included in the captured ions will be smaller than the maximum amount. By comparison, the mass spectrometer described in Clause 1 selects the analysis-target ion by the mass separation section outside the ion capture section and introduces only the analysis-target ion into the ion capture section. Therefore, the analysis-target ion can be captured in the maximum amount and be subjected to the electron diffraction measurement. Accordingly, a diffraction image with a higher level of intensity can be more efficiently obtained than ever before.

(Clause 2)

In the mass spectrometer described in Clause 1, the mass separation section may include:
a front mass separation section configured to select, as a precursor ion, an ion having a specific mass-to-charge ratio from the ions generated by the ionization section;
a dissociation section configured to dissociate the precursor ion into product ions; and
a rear mass separation section configured to select an ion having a specific mass-to-charge ratio from the product ions.

The mass spectrometer described in Clause 2 can perform mass spectrometry using an ion characteristic of a measurement-target compound by selecting a precursor ion and a product ion with the front and rear mass separation sections, respectively, as well as an electron diffraction measurement for structural isomers by selecting a product ion having a local partial structure including a position at which the structural isomers differ from each other in molecular structure.

(Clause 3)

The mass spectrometer described in Clause 1 or 2 may further include:
a deflection section located between the mass separation section and the ion detector, and configured to receive ions from the mass separation section and deflect the ions in a different flight direction,
wherein:
the ion capture section is located on a flight path of the ions deflected by the deflection section.

In the mass spectrometer described in Clause 3, the ions separated by the mass separation section are introduced into the ion capture section after being deflected. The ions can be thereby separated from neutral molecules so that only the ions to be analyzed are introduced into the ion capture section. This lowers the background in the electron diffraction image which occurs due to the scattering of electrons by neutral molecules. Furthermore, the mass spectrometer described in Clause 3 can concurrently perform both an electron diffraction measurement by capturing an ion having a predetermined mass-to-charge ratio generated from a sample and irradiating the ion with an electron beam, and a mass spectrometric analysis of an ion newly generated in the ionization section.

(Clause 4)

The mass spectrometer described in one of Clauses 1-3 may further include a voltage application section configured to apply a rectangular voltage for capturing ions within the ion capture section.

The mass spectrometer described in Clause 4 does not require a large-sized power source since the mass-to-charge ratio (range) of ions to be captured within the ion capture section can be changed by varying the frequency of the rectangular voltage while constantly maintaining its amplitude. There is also no possibility of an occurrence of electric discharge or unintended deflection of the flying electrons due to an application of high voltage.

(Clause 5)

In the mass spectrometer described in one of Clauses 1-4, the auxiliary measurement section may include:
an irradiation section configured to irradiate ions captured within the ion capture section with electromagnetic waves or a particle beam; and
a detection section configured to detect electromagnetic waves or a particle exiting from the ion capture section.

The mass spectrometer described in Clause 5 can be used for various measurements as follows: For example, an electron diffraction measurement can be performed by irradiating an ion captured within the ion capture section with an electron beam ("captured ion") and measuring the electron beam diffracted by the ion, to obtain information concerning the molecular structure of the ion. Electron energy loss spectroscopy can be performed by irradiating a captured ion with an electron beam to excite the ion and measuring the electrons scattered by the ion, to obtain information concerning the electronic state of the ion. An electronic structure analysis or elemental analysis of an ion can be performed by using the device as an electron microprobe analyzer (EPMA) which irradiates a captured ion with an electron beam to excite the ion, and measures light emitted from the ion. Ion scattering spectroscopy can be performed by irradiating a captured ion with an ion beam to excite the captured ion, and detecting the ion scattered by the captured ion, to perform an elemental analysis. Particle induced fluorescence spectroscopy can be performed by irradiating a captured ion with an ion beam to excite the captured ion, and detecting light emitted from the ion, to perform an elemental analysis. Atomic absorption spectroscopy can be performed by irradiating a captured ion with a light beam to excite the ion, and detecting light emitted from the ion, to perform an elemental analysis. A laser diffraction measurement or X-ray diffraction measurement can be performed by irradiating a captured ion with a light beam and detecting the light diffracted by the ion, to obtain information concerning the shape or molecular structure of the ion. An X-ray absorption edge measurement or Fourier transform infrared spectroscopy which includes irradiating a captured ion with light and detecting the light transmitted through the ion to measure the amount of absorption of light by the ion, can be performed to obtain information concerning the intramolecular bond of the ion. A Raman spectroscopic measurement can be performed by irradiating a captured ion with light and detecting the light scattered by the ion, to obtain information concerning the intramolecular bond of the ion. A photoelectron spectroscopic measurement which includes irradiating a captured ion with light and measuring electrons emitted from the ion can be performed to obtain information concerning the electronic state or bonding state of the ion.

(Clause 6)

In the mass spectrometer described in Clause 5, the irradiation section may be configured to deliver the electromagnetic waves or particle beam in a pulsed form into the ion capture section when a rectangular voltage with a predetermined phase is applied from the voltage application section to the ion capture section.

In the mass spectrometer described in Clause 5, the phase of the rectangular voltage at which the ions within the ion capture section will be spread on the delivery path of the electromagnetic waves or particle beam can be determined beforehand by simulation or preliminary experiments. By defining this phase as the predetermined phase mentioned in Clause 6, a greater amount of ions can be irradiated with the electromagnetic waves or particle beam, and high-intensity signals can be obtained. In the case of a conventional mass spectrometer configured to capture ions within an ion trap by applying a radio-frequency sinusoidal voltage to the ring electrode, a phase difference occurs between the voltage which drives the resonance circuit and the voltage actually applied from the resonance circuit to the electrode. This phase difference depends on the load impedance of the electrode and vanes depending on the shape and holding method of the electrode as well as other factors. Therefore, it is difficult to deliver the electromagnetic waves or particle beam at the exact moment when the radio-frequency sinusoidal voltage is at a specific phase. Even if the delivery can be adjusted to the phase, the amplitude of the radio-frequency sinusoidal voltage needs to be changed according to the mass-to-charge ratio of the measurement-target ion, and the voltage-setting value in the optical system for injecting the electromagnetic waves or particle beam also needs to be changed accordingly. By comparison, in the mass spectrometer described in Clause 5, since the driving voltage is directly applied to the electrode without using a resonance circuit, the delivery of the electromagnetic waves or particle beam can be controlled to be adjusted to the optimum phase. When the mass-to-charge ratio of the measurement-target ion is changed, only the frequency of the rectangular voltage needs to be changed, while its amplitude is constantly maintained. Therefore, it is unnecessary to change the voltage-setting value in the optical system for injecting the electromagnetic waves or particle beam.

(Clause 7)

The mass spectrometer described in Clause 5 or 6 may be configured as follows:
  the irradiation section is an electron-beam irradiation section configured to deliver an electron beam into the ion capture section; and
  the detection section is configured to detect the electron beam diffracted by the ion.

The mass spectrometer described in Clause 7 can perform an electron diffraction measurement of an ion having a specific mass-to-charge ratio (or ions having a specific range of mass-to-charge ratios) captured within the ion capture section, to obtain information concerning the molecular structure of the ion.

(Clause 8)

The mass spectrometer described in Clause 7 may further include:
  a molecular structure candidate input reception section configured to receive an input of information of a molecular structure candidate; and
  a first molecular structure estimation section configured to estimate the molecular structure of a molecule contained in a sample by comparing an electron diffraction image obtained by a measurement of the sample and an electron diffraction image prepared for the molecular structure candidate.

The mass spectrometer described in Clause 8 uses an electron diffraction image prepared beforehand (e.g., an electron diffraction image obtained by electron diffraction with a standard sample, or an electron diffraction image estimated based on a theoretical calculation as will be described in the next clause), so that an electron diffraction image obtained by a measurement can be more conveniently analyzed. Unlike a diffraction peak obtained by a common type of electron diffraction measurement, the diffraction image obtained by the mass spectrometer described in Clause 7 is in the form of concentric interference fringes. Such a type of data can be processed as a kind of image data. Accordingly, for example, a classifier created by machine learning using various patterns of the entire diffraction image obtained by the electron diffraction measurement and/or theoretical calculation of various compounds can be used as the first molecular structure estimation section.

(Clause 9)

The mass spectrometer described in Clause 8 may further include an electron diffraction image estimation section configured to estimate an electron diffraction image by a theoretical calculation based on a molecular structure received by the molecular structure candidate input reception section.

The mass spectrometer described in Clause 9 can estimate an electron diffraction image for even a compound that is not recorded in a compound database.

(Clause 10)

In the mass spectrometer described in one of Clauses 7-9, the electron beam irradiation section may be configured to be capable of varying the energy of the electron beam.

(Clause 11)

The mass spectrometer described in Clause 10 may further include a second molecular structure estimation section configured to estimate the structure of a sample molecule based on electron diffraction images obtained by irradiation with the electron beam with different amounts of energy.

The mass spectrometers described in Clauses 10 and 11 can perform an electron diffraction measurement using the electron beam with different amounts of energy to obtain different electron diffraction images for the same molecule and use those images for an analysis of the molecular structure.

(Clause 12)

The mass spectrometer described in one of Clauses 7-11 may further include a third molecular structure estimation section configured to estimate a molecular structure of a sample molecule based on an electron diffraction image obtained by a measurement of a compound formed by bonding a previously determined kind of atom to a specific position on the sample molecule.

The mass spectrometer described in Clause 12 can perform a structural analysis using an electron diffraction image of a molecule in which an atom that has a large atomic number and scatters a larger number of electrons is added to a noteworthy site in the molecule (e.g., at or near the position at which isomers have different structures) as the previously specified kind of atom mentioned in Clause 12. This atom increases the magnitude of the scattering of the electron beam at the site concerned, so that the interference fringes which reflect the noteworthy structure can be obtained with high intensity.

(Clause 13)

The mass spectrometer described in one of Clauses 1-12 may further include a separation means configured to separate compounds contained in a sample before ions are mass-separated in the mass separation section.

(Clause 14)

In the mass spectrometer described in Clause 13, the separation means may be a chromatograph apparatus and/or an ion mobility spectrometer.

In the mass spectrometer described in Clause 13, the compounds contained in the sample are separated from each other before being introduced into the ion source. Therefore, it is possible to select only a target compound for the measurement and remove influences of the other compounds so that the mass spectrometry and electron diffraction measurement can be performed with a high level of accuracy. As the separation means, a chromatograph apparatus (e.g., liquid chromatograph or gas chromatograph) or ion mobility spectrometer can be used, as described in Clause 14. When the separation means is a chromatograph apparatus, the compounds contained in the sample are separated from each other, and each compound is individually introduced into and ionized by the ionization section. In this case, the separation means is located in the previous stage of the mass spectrometer. When the separation means is an ion mobility spectrometer, the compounds contained in the sample are collectively ionized in the ionization section, and the ions derived from the individual compounds are subsequently separated from each other by the ion mobility spectrometer before being introduced into the mass separation section. In this case, the separation means is placed between the ionization section and the mass separation section in the mass spectrometer. Thus, the "separation of compounds" includes the separation of ions derived from the individual compounds.

Some kinds of isomers can be separated by a column of a chromatograph apparatus. However, mere separation of compounds by a chromatograph apparatus does not provide information concerning the molecular structure of a compound. By additionally performing an electron diffraction measurement, information concerning the molecular structure of a compound can be obtained, so that the compounds in a sample can be more accurately analyzed.

It is said that an ion mobility spectrometer can distinguish between isomers. However, a measured value of the collision cross section of an ion often disagrees with its theoretical value. Furthermore, the measured value of the collision cross section of an ion varies depending on the configuration of the device (e.g., depending on the manufacturer) or the kind of gas with which the ion is made to collide. Therefore, in some cases, it may be difficult to compare a measured value of the collision cross section of an ion with the values stored in a database, so that it may be impossible to determine the molecular structure of the ion. A system including an ion mobility spectrometer combined with the mass spectrometer according to the present invention can obtain not only the collision cross section of an ion but also its molecular structure information by an electron diffraction measurement, so that the compounds in a sample can be more accurately analyzed.

REFERENCE SIGNS LIST

1 . . . Mass Spectrometer
10 . . . Main Unit
20 . . . Ionization Chamber
21 . . . First Intermediate Vacuum Chamber
22 . . . Second Intermediate Vacuum Chamber
23 . . . Analysis Chamber
231 . . . Front Quadrupole Mass Filter
232 . . . Collision Cell
234 . . . Quadrupole Rod Electrode
235 . . . Rear Quadrupole Mass Filter
236 . . . Deflection Unit
2361 . . . Rod Electrode
237 . . . Ion Detector
30 . . . Electron-Beam Irradiation Unit
301 . . . Electron Gun
302 . . . Electron Lens
31 . . . Ion Trap
311 . . . Ring Electrode
312 . . . Entrance End-Cap Electrode
313 . . . Exit End-Cap Electrode
316 . . . Vacuum Chamber
317 . . . Gas Introduction Port
32 . . . Electron-Beam Detection Unit
321 . . . Faraday Cup
322 . . . Micro ichannel Plate
323 . . . Fluorescent Screen
324 . . . CCD Camera
4 . . . Controlling-Processing Unit
41 . . . Storage Section
411 . . . Compound Database
42 . . . Mass Spectrometry Program
43 . . . Measurement Condition Setter
44 . . . Analysis Controller
45 . . . Analytical Processor
46 . . . Electron Diffraction Image Estimator
47 . . . Molecular Structure Estimator
471 . . . First Molecular Structure Estimator
472 . . . Second Molecular Structure Estimator
473 . . . Third Molecular Structure Estimator
5 . . . Voltage Application Unit
6 . . . Input Unit
7 . . . Display Unit

The invention claimed is:

1. A mass spectrometer, comprising:
an ionization section configured to generate ions from a sample;
a mass separation section configured to separate ions generated by the ionization section according to mass-to-charge ratio;

an ion detector configured to detect an ion separated by the mass separation section;
an ion capture section configured to capture an ion separated by the mass separation section; and
an auxiliary measurement section configured to measure a physical quantity of the ion captured by the ion capture section, where the physical quantity is different from mass-to-charge ratio;
wherein the mass separation section includes:
a front mass separation section configured to select, as a precursor ion, an ion having a specific mass-to-charge ratio from the ions generated by the ionization section;
a dissociation section configured to dissociate the precursor ion into product ions; and
a rear mass separation section configured to select an ion having a specific mass-to-charge ratio from the product ions.

2. The mass spectrometer according to claim 1, further comprising:
a deflection section located between the mass separation section and the ion detector, and configured to receive ions from the mass separation section and deflect the ions in a different flight direction,
wherein:
the ion capture section is located on a flight path of the ions deflected by the deflection section.

3. The mass spectrometer according to claim 1, further comprising:
a voltage application section configured to apply a rectangular voltage for capturing ions within the ion capture section.

4. The mass spectrometer according to claim 1, wherein the auxiliary measurement section includes:
an irradiation section configured to irradiate ions captured within the ion capture section with electromagnetic waves or a particle beam; and
a detection section configured to detect electromagnetic waves or a particle exiting from the ion capture section.

5. The mass spectrometer according to claim 4, wherein:
the irradiation section is an electron-beam irradiation section configured to deliver an electron beam into the ion capture section; and
the detection section is configured to detect the electron beam diffracted by the ion.

6. The mass spectrometer according to claim 1, further comprising:
a voltage application section configured to apply a rectangular voltage for capturing ions within the ion capture section,
wherein the auxiliary measurement section includes:
an irradiation section configured to irradiate ions captured within the ion capture section with electromagnetic waves or a particle beam; and
a detection section configured to detect electromagnetic waves or a particle exiting from the ion capture section, and
wherein the irradiation section is configured to deliver the electromagnetic waves or particle beam in a pulsed form into the ion capture section when a rectangular voltage with a predetermined phase is applied from the voltage application section to the ion capture section.

7. A mass spectrometer, comprising:
an ionization section configured to generate ions from a sample;
a mass separation section configured to separate ions generated by the ionization section according to mass-to-charge ratio;
an ion detector configured to detect an ion separated by the mass separation section;
an ion capture section configured to capture an ion separated by the mass separation section;
an auxiliary measurement section configured to measure a physical quantity of the ion captured by the ion capture section, where the physical quantity is different from mass-to-charge ratio;
wherein the auxiliary measurement section includes:
an irradiation section configured to irradiate ions captured within the ion capture section with electromagnetic waves or a particle beam; and
a detection section configured to detect electromagnetic waves or a particle exiting from the ion capture section;
wherein the irradiation section is an electron-beam irradiation section configured to deliver an electron beam into the ion capture section; and
the detection section is configured to detect the electron beam diffracted by the ion;
a molecular structure candidate input reception section configured to receive an input of information of a molecular structure candidate; and
a first molecular structure estimation section configured to estimate a molecular structure of a molecule contained in a sample by comparing an electron diffraction image obtained by a measurement of the sample and an electron diffraction image prepared for the molecular structure candidate.

8. The mass spectrometer according to claim 7, further comprising an electron diffraction image estimation section configured to estimate an electron diffraction image by a theoretical calculation based on a molecular structure received by the molecular structure candidate input reception section.

9. A mass spectrometer, comprising:
an ionization section configured to generate ions from a sample;
a mass separation section configured to separate ions generated by the ionization section according to mass-to-charge ratio;
an ion detector configured to detect an ion separated by the mass separation section;
an ion capture section configured to capture an ion separated by the mass separation section;
an auxiliary measurement section configured to measure a physical quantity of the ion captured by the ion capture section, where the physical quantity is different from mass-to-charge ratio; a voltage application section configured to apply a rectangular voltage for capturing ions within the ion capture section,
wherein the auxiliary measurement section includes:
an irradiation section configured to irradiate ions captured within the ion capture section with electromagnetic waves or a particle beam; and
a detection section configured to detect electromagnetic waves or a particle exiting from the ion capture section;
wherein the irradiation section is an electron-beam irradiation section configured to deliver an electron beam into the ion capture section; and
the detection section is configured to detect the electron beam diffracted by the ion;
wherein the electron beam irradiation section is configured to be capable of varying energy of the electron beam.

10. The mass spectrometer according to claim 9, further comprising a second molecular structure estimation section configured to estimate a structure of a sample molecule based on electron diffraction images obtained by irradiation with the electron beam with different amounts of energy.

11. A mass spectrometer, comprising:
an ionization section configured to generate ions from a sample;
a mass separation section configured to separate ions generated by the ionization section according to mass-to-charge ratio;
an ion detector configured to detect an ion separated by the mass separation section;
an ion capture section configured to capture an ion separated by the mass separation section;
an auxiliary measurement section configured to measure a physical quantity of the ion captured by the ion capture section, where the physical quantity is different from mass-to-charge ratio; a voltage application section configured to apply a rectangular voltage for capturing ions within the ion capture section,
wherein the auxiliary measurement section includes:
an irradiation section configured to irradiate ions captured within the ion capture section with electromagnetic waves or a particle beam; and
a detection section configured to detect electromagnetic waves or a particle exiting from the ion capture section;
wherein the irradiation section is an electron-beam irradiation section configured to deliver an electron beam into the ion capture section; and
the detection section is configured to detect the electron beam diffracted by the ion;
a third molecular structure estimation section configured to estimate a molecular structure of a sample molecule based on an electron diffraction image obtained by a measurement of a compound formed by bonding a previously determined kind of atom to a specific position of the sample molecule.

12. The mass spectrometer according to claim 11, further comprising a separation means configured to separate compounds contained in a sample before ions are mass-separated in the mass separation section.

13. The mass spectrometer according to claim 12, wherein the separation means is a chromatograph apparatus and/or an ion mobility spectrometer.

* * * * *